(12) United States Patent
Moon et al.

(10) Patent No.: US 10,786,336 B2
(45) Date of Patent: Sep. 29, 2020

(54) COMBINED MODEL SCANNING AND ORAL CAVITY SCANNING APPARATUS

(71) Applicants: VATECH Co., Ltd., Gyeonggi-do (KR); VATECH EWOO Holdings Co., Ltd., Gyeonggi-do (KR)

(72) Inventors: An O Moon, Gyeonggi-do (KR); Yeong Kyun Kim, Gyeonggi-do (KR)

(73) Assignees: VATECH Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/653,108

(22) Filed: Oct. 15, 2019

(65) Prior Publication Data

US 2020/0038154 A1    Feb. 6, 2020

Related U.S. Application Data

(63) Continuation of application No. 15/526,648, filed as application No. PCT/KR2015/005037 on May 20, 2015, now abandoned.

(30) Foreign Application Priority Data

May 8, 2015    (KR) .................. 10-2015-0064544

(51) Int. Cl.
*A61C 13/34*    (2006.01)
*A61C 9/00*    (2006.01)
*A61C 19/04*    (2006.01)

(52) U.S. Cl.
CPC ............ *A61C 13/34* (2013.01); *A61C 9/0053* (2013.01); *A61C 9/0093* (2013.01); *A61C 19/04* (2013.01)

(58) Field of Classification Search
CPC ..... A61C 13/34; A61C 9/0093; A61C 9/0053; A61C 19/04
See application file for complete search history.

(56) References Cited

U.S. PATENT DOCUMENTS

| 2006/0102833 A1 | 5/2006 | Eiff et al. |
| 2006/0253212 A1 | 11/2006 | Weber et al. |

(Continued)

FOREIGN PATENT DOCUMENTS

| JP | 2004-344262 A | 12/2004 |
| KR | 10-2011-0097566 A | 8/2011 |

(Continued)

*Primary Examiner* — Howard D Brown, Jr.
(74) *Attorney, Agent, or Firm* — IP Legal Services, LLC

(57) ABSTRACT

The present invention relates to a combined model scanning and oral cavity scanning apparatus. The combined model scanning and oral cavity scanning apparatus includes an optical three-dimensional measurement unit configured to generate light, acquire intraoral shape information, and acquire model shape information, a data processor configured to generate three-dimensional tooth data, a data transmission unit configured to transmit the three-dimensional tooth data, a main body accommodating the optical three-dimensional measurement unit, the data processor, and the data transmission unit, and at least two intraoral scanning tips configured to be alternately detachable to the main body and provide light paths, wherein the at least two intraoral scanning tips includes a model scanning tip for scanning a dental model.

9 Claims, 4 Drawing Sheets

(56) References Cited

U.S. PATENT DOCUMENTS

| | | |
|---|---|---|
| 2007/0046663 A1 | 3/2007 | Brinkmann et al. |
| 2007/0172101 A1 | 7/2007 | Kriveshko et al. |
| 2007/0172112 A1* | 7/2007 | Paley .................... A61C 19/04 382/154 |
| 2008/0015727 A1 | 1/2008 | Dunne et al. |
| 2008/0085489 A1* | 4/2008 | Schmitt .................. G16H 50/50 433/75 |
| 2008/0199829 A1* | 8/2008 | Paley .................. A61B 5/1077 433/215 |
| 2009/0298017 A1 | 12/2009 | Boerjes et al. |
| 2010/0151410 A1 | 6/2010 | Dunne et al. |
| 2010/0152871 A1 | 6/2010 | Dunne et al. |
| 2010/0152872 A1 | 6/2010 | Dunne et al. |
| 2010/0152873 A1 | 6/2010 | Dunne et al. |
| 2012/0130252 A1 | 5/2012 | Pohjanen et al. |
| 2012/0231421 A1 | 9/2012 | Boerjes et al. |
| 2013/0101967 A1 | 4/2013 | Johnson et al. |
| 2013/0108981 A1 | 5/2013 | Duret |
| 2013/0272775 A1 | 10/2013 | Ortwein |
| 2013/0286174 A1 | 10/2013 | Urakabe |
| 2014/0248576 A1 | 9/2014 | Tchouprakov et al. |
| 2015/0018613 A1 | 1/2015 | Hollenbeck et al. |
| 2016/0008111 A1* | 1/2016 | Jumpertz ................ A61C 13/34 348/46 |
| 2016/0051348 A1 | 2/2016 | Boerjes et al. |

FOREIGN PATENT DOCUMENTS

| | | |
|---|---|---|
| KR | 10-1108627 B1 | 1/2012 |
| KR | 20-0466356 Y1 | 4/2013 |

\* cited by examiner

COMBINED MODEL SCANNING AND ORAL CAVITY SCANNING APPARATUS

CROSS REFERENCE TO RELATED APPLICATIONS

This application is a Continuation of U.S. patent application Ser. No. 15/526,648 (filed on May 12, 2017), which is a National Stage Patent Application of PCT International Patent Application No. PCT/KR2015/005037 (filed on May 20, 2015) under 35 U.S.C. § 371, which claims priority to Korean Patent Application No. 10-2015-0064544 (filed on May 8, 2015), the teachings of which are incorporated herein in their entireties by reference.

TECHNICAL FIELD

The present invention relates generally to a combined model scanning and oral cavity scanning apparatus. More particularly, the present invention relates to a combined model scanning and oral cavity scanning apparatus, in which parts of the components of the intraoral scanner that can be shared with the model scanner double as the same.

BACKGROUND ART

For accurate and more effective three-dimensional modeling for dental treatment, both an intraoral scanner for direct intraoral imaging and a model scanner for scanning a dental model, such as gypsum or impression body are required.

However, it is economically burdensome to have the above two scanners for accurate three-dimensional modeling of a patient's tooth, and considering the space occupied by the intraoral scanner and the model scanner, namely, the above two scanners, there is a problem that the space efficiency is lowered.

DISCLOSURE

Technical Problem

Accordingly, the present invention has been made keeping in mind the above problems occurring in the prior art, and an object of the present invention is to provide a combined model scanning and oral cavity scanning apparatus, in which parts of the components of the intraoral scanner that can be shared with the model scanner double as the same, whereby it is possible to reduce the economic burden of clinics and to improve the efficiency of the treatment space.

Technical Solution

In order to accomplish the above object, the present invention provides a combined model scanning and oral cavity scanning apparatus including: an optical three-dimensional measurement unit configured to generate light, acquire intraoral shape information according to measurement of an intraoral tooth shape by using the light, and acquire model shape information according to measurement of a tooth model shape; a data processor configured to generate three-dimensional tooth data for producing a three-dimensional tooth image by receiving the intraoral shape information or the model shape information; and a data transmission unit configured to transmit the three-dimensional tooth data.

Meanwhile, the combined model scanning and oral cavity scanning apparatus may further include a first intraoral scanning tip configured to be set for a first measurement area of the intraoral shape information by providing a first focal length and a first reflection area for the light generated from the optical three-dimensional measurement unit, wherein the first intraoral scanning tip is configured such that a first end thereof is provided with a window adjacent to an intraoral tooth, and a second end thereof is provided with a coupling structure detachable from a structure of a main body including the optical three-dimensional measurement unit, the data processor, and the data transmission unit.

The combined model scanning and oral cavity scanning apparatus may further include a second intraoral scanning tip configured to be set for a second measurement area of the intraoral shape information having a size different from the first measurement area by providing a second focal length and a second reflection area for the light generated from the optical three-dimensional measurement unit, wherein the second intraoral scanning tip is configured such that a first end thereof is provided with a window adjacent to an intraoral tooth, and a second end thereof is provided with a coupling structure detachable from the structure of the main body.

Meanwhile, the combined model scanning and oral cavity scanning apparatus may further include a model scanning tip configured to be set for a measurement area of the model shape information by providing a third focal length for the light generated from the optical three-dimensional measurement unit, wherein the model scanning tip is configured such that a first end thereof is provided with an opening toward a dental model, and a second end thereof is provided with a coupling structure detachable from a structure of a main body including the optical three-dimensional measurement unit, the data processor, and the data transmission unit.

The combined model scanning and oral cavity scanning apparatus may further include: a chamber provided with a gate configured to be opened to accommodate the dental model, whereby the dental model is accommodated therein; a rotating unit disposed at a lower portion of an inside of the chamber, and configured to move the dental model being coupled thereon; and a scanner coupling unit disposed at an upper part of the chamber, and configured to be open to an outside at a location where an image of the dental model is obtained and to be coupled to the main body.

Advantageous Effects

According to the present invention, by making the most of the parts that can be used for both the intraoral scanner and the model scanner, it is possible to reduce the economic burden of clinics and to improve the efficiency of the treatment space.

DESCRIPTION OF NUMERALS

Figure 1:
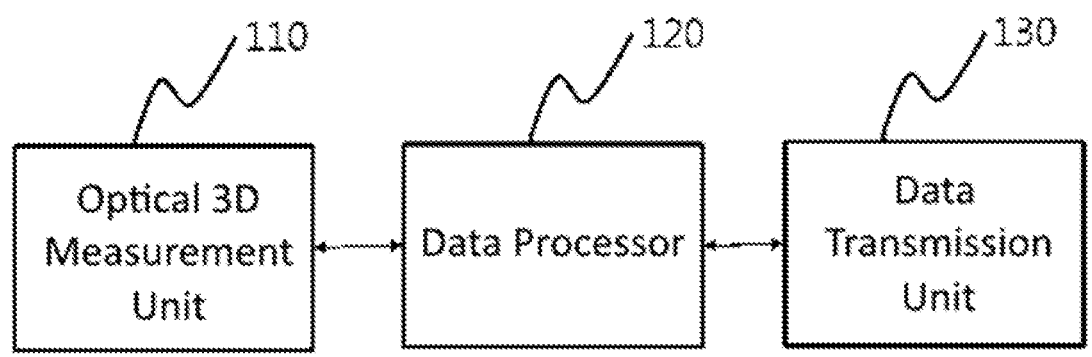
FIG. 1 is a view showing a combined model scanning and oral cavity scanning apparatus according to an embodiment of the present invention.

- 100: main body 110: optical three-dimensional measurement unit
- 120: data processor 130: data transmission unit
- 200: first intraoral scanning tip 210: first case
- 220: first reflector 230: first lens
- 300: model scanning tip 310: third case
- 320: third lens 410: chamber
- 420: rotating unit 430: scanner coupling unit

MODE FOR INVENTION

Hereinbelow, preferred embodiments of the present invention will be described in detail with reference to the accompanying drawings. However, it should be understood that the embodiment of the present invention may be changed to a variety of embodiments and the scope and spirit of the present invention are not limited to the embodiment described hereinbelow. Also, for convenience of understanding of the elements, in the figures, sizes or thicknesses may be exaggerated to be large (or thick), may be expressed to be small (or thin) or may be simplified for clarity of illustration, and throughout the drawings, the same reference numerals will refer to the same or like parts.

Throughout the specification, it will be understood that when an element is referred to as being "coupled" or "connected" to another element, it can be directly coupled or connected to the other element, or electrically coupled or connected with other elements therebetween. It will be further understood that the terms "comprise", "include", "have", etc. when used in this specification, do not preclude the presence or addition of one or more other features, integers, steps, operations, elements, components, and/or combinations thereof, unless otherwise noted.

It will be understood that, although the terms first, second, etc. may be used herein to distinguish one element, from another element. For instance, a first element discussed below could be termed a second element without departing from the teachings of the present invention. Similarly, the second element could also be termed the first element.

FIG. 1 is a view showing a combined model scanning and oral cavity scanning apparatus according to an embodiment of the present invention, wherein the combined model scanning and oral cavity scanning apparatus according to the embodiment of the present invention includes an optical three-dimensional measurement unit 110, a data processor 120, and a data transmission unit 130.

The optical three-dimensional measurement unit 110 is configured to output light for detecting an intraoral tooth shape or a tooth model shape, generate intraoral shape information according to measurement of the intraoral tooth shape, output the intraoral shape information acquired by using the generated light to the data processor 120, acquire model shape information according to measurement of the tooth model shape by using the generated light, and output the acquired model shape information to the data processor 120. In other words, when the combined model scanning and oral cavity scanning apparatus is used as an intraoral scanner, the optical three-dimensional measurement unit 110 serves as an optical instrument that produces an image of a patient's intraoral tooth imaged directly thereby. When the combined model scanning and oral cavity scanning apparatus is used as a model scanner, the optical three-dimensional measurement unit serves as an optical instrument that produces an image of a dental model, such as gypsum or impression body, whereby it is possible to perform both intraoral scan function and model scan function with one optical instrument.

Further, the data processor 120 is configured to generate three-dimensional tooth data for producing a three-dimensional tooth image by receiving the intraoral shape information or the model shape information from the optical three-dimensional measurement unit 110, and output the generated three-dimensional tooth data to the data transmission unit 130. In other words, the data processor 120 is configured to acquire center coordinates and codes of the intraoral tooth or the dental model based on the intraoral shape information or the model shape information that is two-dimensional data acquired from the optical three-dimensional measurement unit 110 through image processing, and convert two-dimensional data into three-dimensional tooth data according to a predetermined conversion formula by using coordinate points corresponding to each code.

Meanwhile, the data transmission unit 130 is configured to receive the three-dimensional tooth data from the data processor 120, and transmit the received three-dimensional tooth data to a personal computer, or the like. In other words, the data transmission unit 130 is configured to receive the three-dimensional tooth data input from the data processor 120 and transmit the same to the outside whether it is three-dimensional tooth data on the intraoral tooth or three-dimensional tooth data on the dental model, thereby allowing medical staff or a patient to check the tooth image according to the three-dimensional tooth data through a monitor of the personal computer, or the like.

Figure 2:
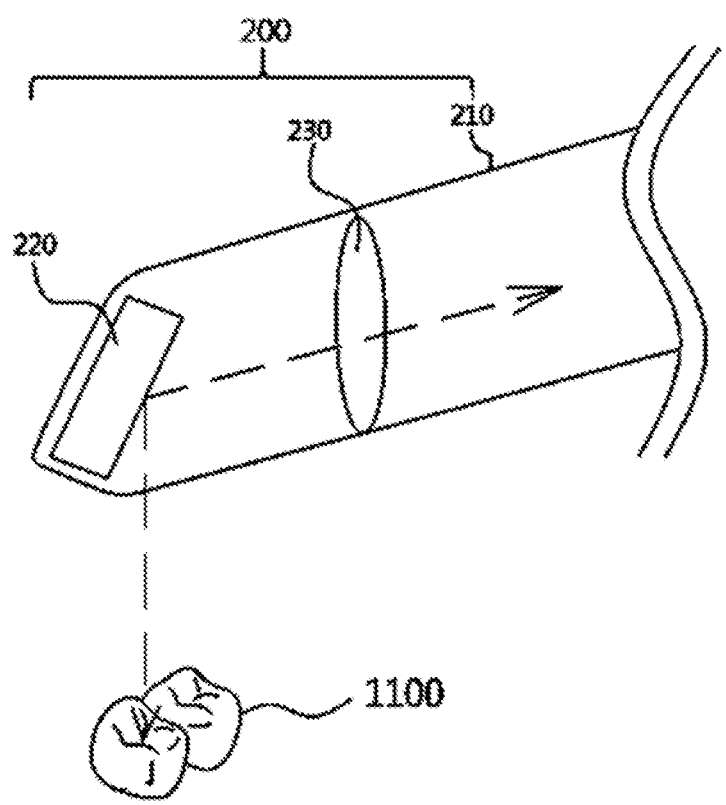
FIG. 2 is a structural view showing a first intraoral scanning tip that is detachable from the combined model scanning and oral cavity scanning apparatus according to an embodiment of the present invention.
Figure 4:
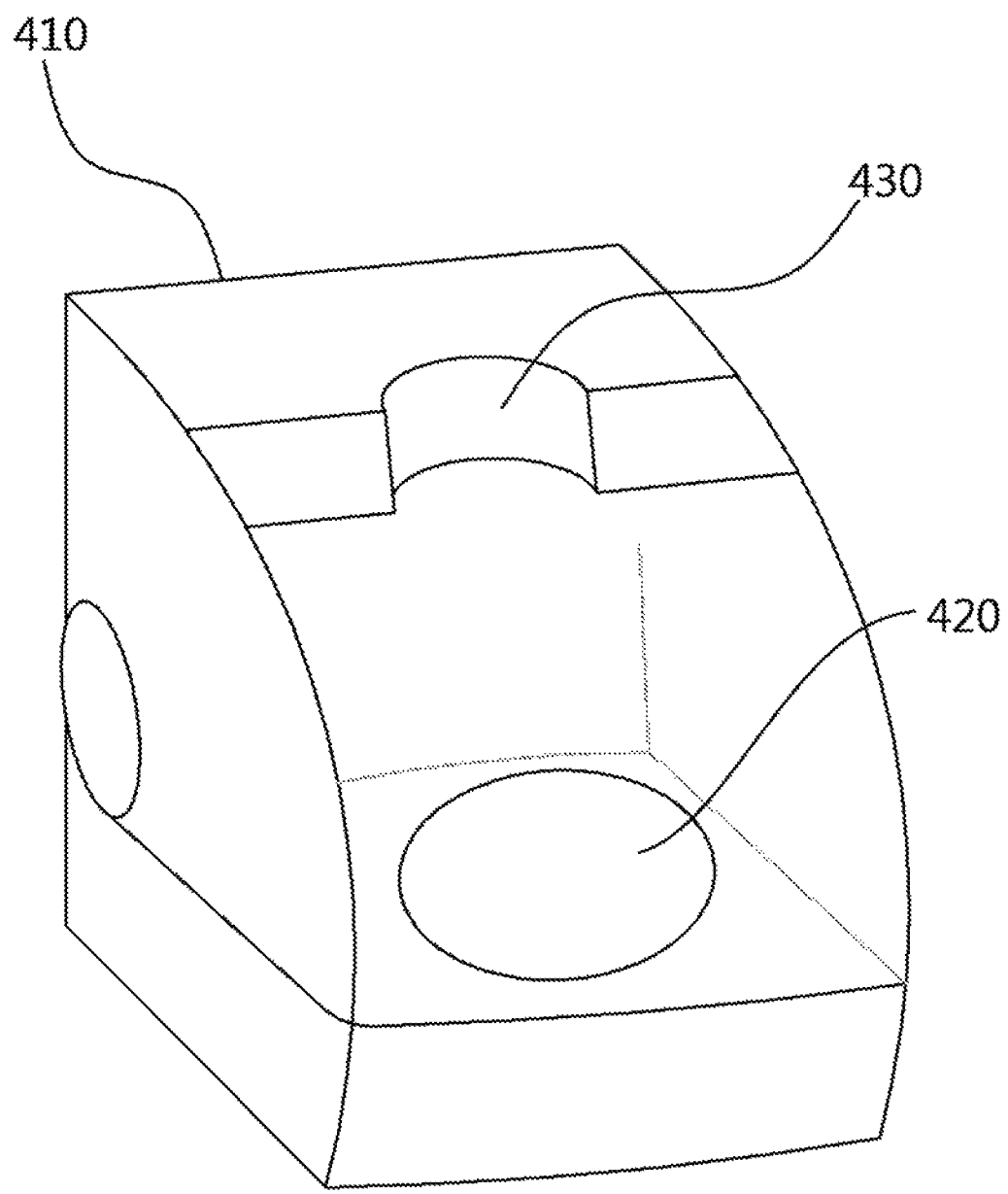
FIGS. 4 and 5 are views showing an operational state of model scanning by the combined model scanning and oral cavity scanning apparatus according to an embodiment of the present invention.
Figure 5:
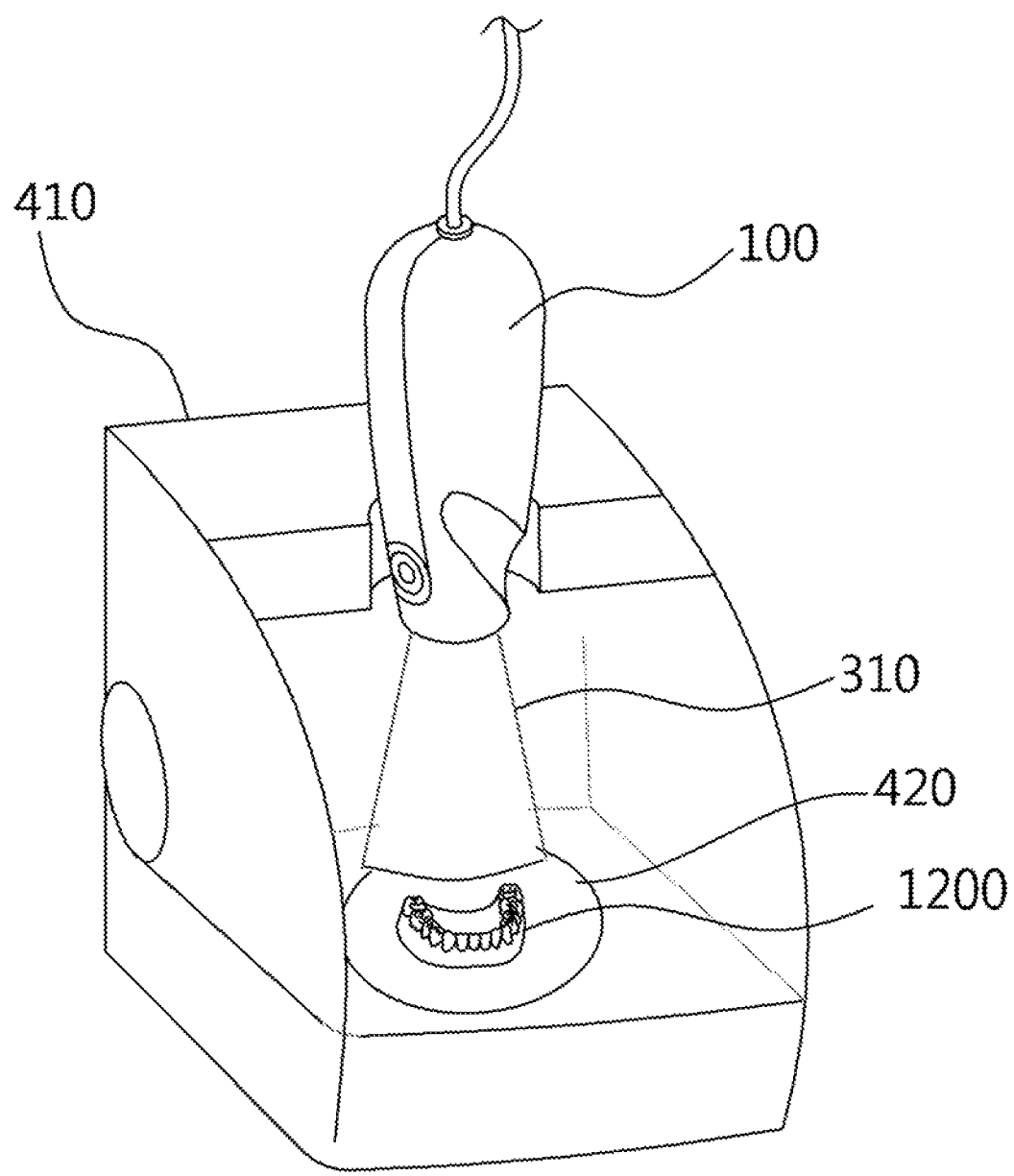

FIG. 2 is a structural view showing a first intraoral scanning tip 200 that is detachable from the combined model scanning and oral cavity scanning apparatus according to an embodiment of the present invention; and FIGS. 4 and 5 are views showing an operational state of model scanning by the combined model scanning and oral cavity scanning apparatus according to an embodiment of the present invention, wherein the first intraoral scanning tip 200 according to the embodiment of the present invention may include a first case 210, a first reflector 220, and a first lens 230, and with reference to FIGS. 2, 4, and 5, description of the configuration and operation of the first intraoral scanning tip 200 is as follows.

Herein, the first intraoral scanning tip 200 may be set for a first measurement area of the intraoral shape information by providing a first reflection area by the first reflector 220 and a first focal length by the first lens 230 for the light generated from the optical three-dimensional measurement unit 110. Herein, the first intraoral scanning tip 200 may be configured such that a first end thereof is provided with a window (not shown) adjacent to the intraoral tooth 1100, and a second end thereof is provided with a coupling structure (not shown) that is detachable from a coupling structure formed on a housing as a main body 100 which includes the optical three-dimensional measurement unit 110, the data processor 120, and the data transmission unit 130.

Here, the first case 210 is configured to be insertable into and withdrawable from a patient's mouth where the tooth 1100 is located, and serves as a measurement inlet of a tooth shape and a light path (a dotted arrow direction shown in FIG. 2) since it is provided with a window at a first end thereof. The first case serves as a measurement outlet of the tooth shape and the light path since it is provided with a path at a second end thereof to provide a tooth shape to the optical three-dimensional measurement unit 110. Here, the first case 210 may be a cylindrical shape, a square pillar shape, or the like, but is not limited thereto as long as it can be a shape capable of providing a path.

Further, the first reflector 220 is made of a high reflectivity material and is configured to be disposed inside the first case 210 to provide a first reflection area for the light generated from the optical three-dimensional measurement unit 110. Here, the first reflector 220 may be disposed at an angle of 45 degrees with respect to a direction parallel to the light path, but is not limited thereto.

Meanwhile, the first lens 230 is configured to be disposed on the light path inside the first case 210 to provide the first focal length for the light generated from the optical three-dimensional measurement unit 110. In other words, the first lens 230 provides a refractive index according to the first focal length, and may be configured such that the longer the first focal length, the smaller the refractive index.

Meanwhile, a second intraoral scanning tip (not shown) may be set for a second measurement area of the intraoral shape information by providing a second reflection area by a second reflector and a second focal length by a second lens for the light generated from the optical three-dimensional measurement unit 110. In other words, the second intraoral scanning tip is detachable from the housing as the main body 100 which includes the data processor 120 and the data transmission unit 130 instead of the first intraoral scanning tip 200, and thereby it is possible to change a size of the measurement area for the intraoral tooth 1100. Herein, the second intraoral scanning tip has a configuration similar to the first intraoral scanning tip 200, and only provides measurement areas of different sizes depending on the difference in refractive index between the first lens 230 and the second lens and the reflector size between the first reflector 220 and the second reflector. In other words, the size of the measurement area is determined by the focal length of the lens and the size of the reflector. The larger the focal length of the lens, the smaller the measurement area, and the shorter the focal length of the lens, the larger the measurement area. Meanwhile, the size of the reflector is directly proportional to the size of the measurement area. The larger the size of the reflector, the larger the measurement area, and the smaller the size of the reflector, the smaller the size of the measurement area. According to the first intraoral scanning tip 200 and the second intraoral scanning tip of the present invention, the first lens 230 has a focal length longer than that of the second lens, and the first reflector 220 has a size smaller than that of the second reflector, whereby the first intraoral scanning tip 200 has a measurement area smaller than that of the second intraoral scanning tip.

Figure 3:
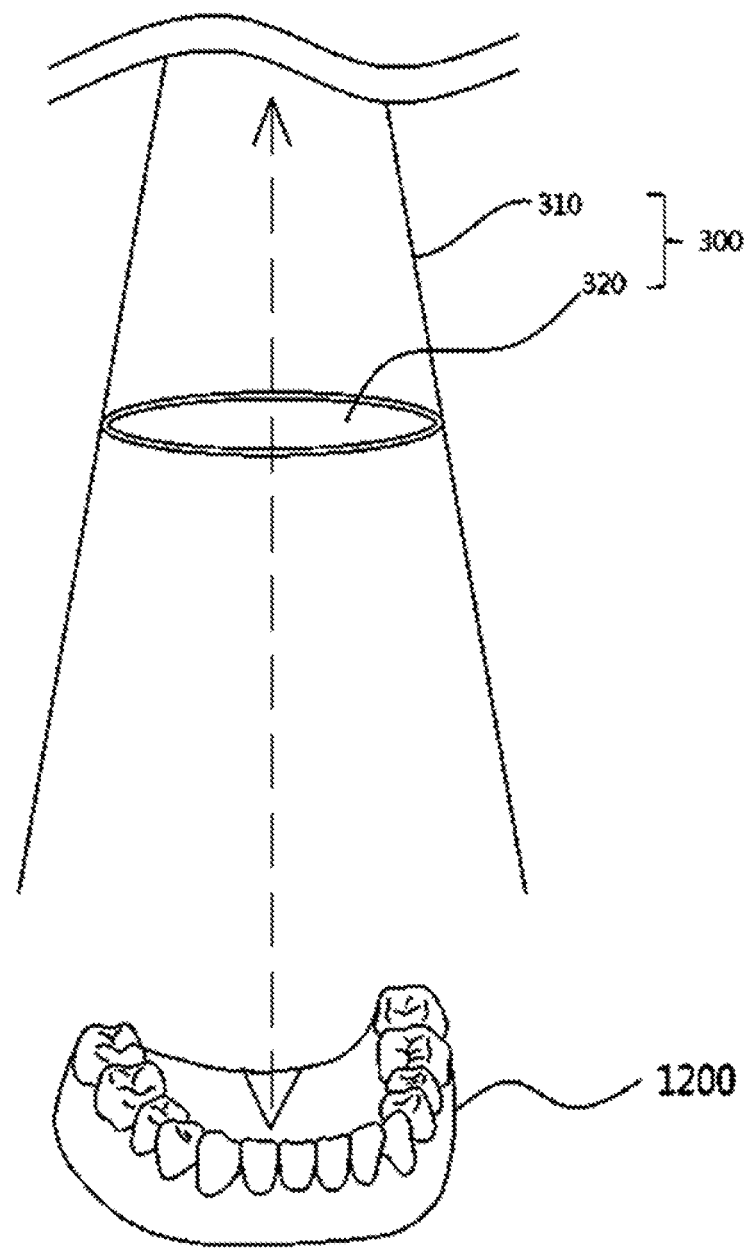
FIG. 3 is a structural view showing a model scanning tip that is detachable from the combined model scanning and oral cavity scanning apparatus according to an embodiment of the present invention.

FIG. 3 is a structural view showing a model scanning tip 300 that is detachable from the combined model scanning and oral cavity scanning apparatus according to an embodiment of the present invention, wherein the model scanning tip 300 according to the embodiment of the present invention includes a third case 310 and a third lens 320.

Herein, the model scanning tip 300 may be set for a measurement area of the model shape information by providing a third focal length by the third lens 320 for the light generated from the optical three-dimensional measurement unit 110. Herein, the model scanning tip 300 may be configured such that a first end thereof is provided with an opening adjacent to a dental model 1200, and a second end thereof is provided with a coupling structure (not shown) that is detachable from the coupling structure formed on the housing as the main body 100, which includes the optical three-dimensional measurement unit 110, the data processor 120, and the data transmission unit 130.

FIGS. 4 and 5 are views showing an operational state of model scanning by the combined model scanning and oral cavity scanning apparatus according to an embodiment of the present invention, wherein the combined model scanning and oral cavity scanning apparatus according to the embodiment of the present invention may further include a chamber 410, a rotating unit 420, a scanner coupling unit 430, and a switching unit (not shown) in order to perform a model scan function.

The chamber 410 includes a gate (not shown for convenience to identify the inside of the chamber 410) configured to be opened to accommodate the dental model 1200, so the dental model 1200 is accommodated inside the chamber.

Further, the rotating unit 420 is disposed at a lower portion of the inside of the chamber 410, is provided with a disc on which the dental model is coupled, and is configured to move the disc according to a model scan activation signal received from the switching unit (not shown). In other words, the rotating unit 420 is configured such that when the model scan function is performed, the optical three-dimensional measurement unit 110 measures the all parts of the dental model 1200 while moving the disc in a rotation direction, an x-axis direction, and a y-axis direction. In other words, the area from which the reflected light is not incident on the camera in the optical three-dimensional measurement unit 110 by nature of light is not possible to be measured. However, when the dental model 1200 is mounted to the disc of the rotating unit 420, the disc is moved in the rotation direction, the x-axis direction, and the y-axis direction, along with the dental model 1200, whereby the optical three-dimensional measurement unit 110 is capable of measuring the all parts of the dental model 1200. Here, the rotating unit 420 may be rotatable not only around the x-axis direction and y-axis direction, but also in a z-axis direction, but is not limited thereto.

Meanwhile, the scanner coupling unit 430 is disposed at an upper part of the chamber 410, is formed to be open to the outside at a location where the image on the disc of the rotating unit 420 can be obtained, and may be configured to be coupled to the main body 100. In other words, the scanner coupling unit 430 may correspond to a space in which the housing as a main body 100 including the optical three-dimensional measurement unit 110, the data processor 120, and the data transmission unit 130 is accommodated.

Further, the switching unit generates the model scan activation signal as the main body 100 is coupled to the scanner coupling unit 430, and outputs the generated model scan activation signal to a driving means in the rotating unit 420. In other words, the switching unit switches to a model scan mode when the main body 100 is accommodated in the scanner coupling unit 430, and generates the model scan activation signal. Then, the rotating unit 420 aligns the disc in the rotating unit 420 to a predetermined position when receiving the model scan activation signal, and moves the disc in the rotation direction, the x-axis direction, and the y-axis direction based on a center axis thereof.

It is further understood by those skilled in the art that the foregoing description is a preferred embodiment of the disclosed device and that various changes and modifications may be made in the invention without departing from the spirit and scope thereof.

The invention claimed is:

1. A combined dental apparatus comprising:
   a main body including an optical three-dimensional measurement unit configured to output light and acquire scan data of tooth or a dental model;
   a data processor to receive the scan data from the optical three-dimensional measurement unit and generate three-dimensional data;
   a data transmission unit configured to transmit the three-dimensional data; and
   a chamber, wherein
   the chamber includes:
   a rotating unit disposed at a lower portion of an inside of the chamber to accommodate the dental model and to rotate the dental model; and
   a scanner coupling unit disposed at an upper part of the chamber to hold the main body at least while the main body acquires the scan data of the dental model on the rotating unit.

2. The apparatus of claim 1, wherein the optical three-dimensional measurement unit includes one of a detachable intraoral scanning tip for scanning the tooth and a detachable model scanning tip for scanning the dental model.

3. The apparatus of claim 1, wherein the three-dimensional tooth data is one of intraoral information and model shape information.

4. The apparatus of claim 3, wherein the intraoral information is received from the detachable intraoral scanning tip.

5. The apparatus of claim 3, wherein the model shape information is received from the detachable model scanning tip.

6. The apparatus of claim 1, wherein the detachable intraoral scanning tip includes a first reflector to reflect the output light of the optical three-dimensional measurement unit to form a first reflection area and a first lens to provide a focal length to determine a reflective index.

7. The apparatus of claim 1, wherein the detachable model scanning tip includes a first end provided thereof with an opening toward a dental model, and a second end thereof provided with a coupling structure detachable from the optical three-dimensional measurement unit.

8. The apparatus of claim 1, further comprising:
   a switching unit located on the chamber to switch to a model scan mode when the main body is accommodated in the scanner coupling unit.

9. The apparatus of claim 8, wherein the rotating unit aligns the dental model by a model scan activation signal.

* * * * *